(12) United States Patent
Kato et al.

(10) Patent No.: US 7,729,103 B2
(45) Date of Patent: Jun. 1, 2010

(54) SOLID ELECTROLYTIC CAPACITOR AND METHOD OF PRODUCING THE SAME

(75) Inventors: Kikuko Kato, Hirakata (JP); Mutsumi Yano, Hirakata (JP); Kazuhiro Takatani, Takatsuki (JP); Koichi Nishimura, Suita (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 158 days.

(21) Appl. No.: 12/045,191

(22) Filed: Mar. 10, 2008

(65) Prior Publication Data

US 2008/0232036 A1 Sep. 25, 2008

(30) Foreign Application Priority Data

Mar. 20, 2007 (JP) .............................. 2007-073023
Jan. 29, 2008 (JP) .............................. 2008-017360

(51) Int. Cl.
*H01G 9/02* (2006.01)

(52) U.S. Cl. ...................... 361/525; 29/25.03

(58) Field of Classification Search ................ 361/523, 361/525–529; 29/25.03
See application file for complete search history.

(56) References Cited

U.S. PATENT DOCUMENTS

| 4,943,892 | A | * | 7/1990 | Tsuchiya et al. ............ 361/525 |
| 4,959,753 | A | * | 9/1990 | Kudoh et al. ................ 361/525 |
| 5,019,949 | A | * | 5/1991 | Ikeda et al. .................. 361/525 |
| 6,409,777 | B2 | * | 6/2002 | Kobatake et al. ........... 29/25.03 |
| 6,515,848 | B1 | * | 2/2003 | Yoshida et al. .............. 361/525 |
| 6,671,168 | B2 | * | 12/2003 | Yoshida et al. .............. 361/523 |
| 7,126,812 | B2 | * | 10/2006 | Hirata et al. ................. 361/524 |
| 7,221,554 | B2 | * | 5/2007 | Brenneman et al. ......... 361/525 |
| 2003/0081374 | A1 | * | 5/2003 | Takada ........................ 361/523 |
| 2004/0104450 | A1 | * | 6/2004 | Arai et al. .................... 257/532 |
| 2005/0164508 | A1 | * | 7/2005 | Brenneman et al. ......... 438/689 |
| 2008/0010797 | A1 | * | 1/2008 | Qiu et al. .................... 29/25.03 |

FOREIGN PATENT DOCUMENTS

| JP | 05-136005 A1 | 6/1993 |
| JP | 07-153650 A1 | 6/1995 |
| JP | 11-219862 A1 | 8/1999 |

* cited by examiner

*Primary Examiner*—Eric Thomas
(74) *Attorney, Agent, or Firm*—Marvin A. Motsenbocker; Mots Law, PLLC

(57) ABSTRACT

The present invention relates to a solid electrolytic capacitor provided with a anode made of a metal or an alloy having valve action, a dielectric layer formed on the anode, and an electrolyte layer consisting of a conductive polymer layer formed so as to have contact with a portion of the region on the dielectric layer surface and a manganese dioxide layer formed so as to have contact with the other portion of the region on the dielectric layer surface.

9 Claims, 2 Drawing Sheets

SOLID ELECTROLYTIC CAPACITOR AND METHOD OF PRODUCING THE SAME

BACKGROUND OF THE INVENTION

1. Field of the Invention

The present invention relates to a solid electrolytic capacitor and a method of production the same.

2. Description of the Related Art

Since niobium has a dielectric constant about 1.8 times as high as that of tantalum, which is a material for conventional solid electrolytic capacitors, it draws attention as a material for next generation, high capacity solid electrolytic capacitors. Japanese Patent Application Laid-Open (JP-A) No. 07-153650 discloses a solid capacitor obtained by successively forming a solid electrolyte of manganese dioxide and a conductive layer for a cathode on an anode sintered body obtained by sintering a metal powder for valve action such as tantalum and niobium.

However, in the solid electrolytic capacitor disclosed in JP-A No. 07-153650, since the conductivity of manganese dioxide is low, there occurs a problem that ESR (equivalent series resistance) becomes high.

JP-A No. 5-136005 discloses a technique of forming a conductive polymer layer by electrolytic polymerization on a manganese dioxide layer. However, by this technique, ESR could not decrease sufficiently.

SUMMARY OF THE INVENTION

An object of the present invention is to provide a solid electrolytic capacitor having low ESR (equivalent series resistance) and excellent in storage characteristics and a method of producing the same.

A solid electrolytic capacitor of the invention includes an anode made of a metal or an alloy having valve action, a dielectric layer formed on the surface of the anode, and an electrolyte layer consisting of a conductive polymer layer formed so as to have contact with a portion of the region on the dielectric layer surface and a manganese dioxide layer formed so as to have contact with the other portion of the region on the dielectric layer surface.

In the invention, an electrolyte layer to be formed on a dielectric layer consists of a conductive polymer layer formed so as to have contact with a portion of the region on the dielectric layer surface and a manganese dioxide layer formed so as to have contact with the other portion of the region on the dielectric layer surface. The conductivity of a conductive polymer ($10^2$ (S/cm)) is higher than the conductivity of manganese dioxide ($10^{-1}$ (S/cm)). In the invention, since the conductive polymer layer with such a high conductivity is formed so as to have contact with a portion of the region on the dielectric layer surface, as compared with that in the case where only the manganese dioxide layer is formed on the dielectric layer surface, the ESR can be reduced.

Further, in the invention, a manganese dioxide layer is formed so as to have contact with the other portion of the region on the dielectric layer surface. Since the manganese dioxide layer is excellent in adhesiveness to the dielectric layer as compared with the conductive polymer layer, formation of the manganese dioxide layer so as to have contact with the other portion of the region on the dielectric layer surface can improve storage characteristics as compared with that in the case where only the conductive polymer layer is formed on the dielectric layer surface.

Consequently, accordingly to the invention, a solid electrolytic capacitor having low ESR and excellent in storage characteristics can be obtained.

In the invention, the coating ratio of the conductive polymer layer, which is the ratio of the surface area where the conductive polymer layer and the dielectric layer are mutually brought into contact, to the entire surface area of the dielectric layer is preferably in a range of 3 to 70%. If the coating ratio of the conductive polymer layer is lower than 3%, the effect for reducing the ESR may not be caused efficiently. On the other hand, if the coating ratio of the conductive polymer layer exceeds 70%, although the ESR is reduced, the contact surface area of the manganese dioxide layer and the dielectric layer relatively becomes small, and therefore the storage characteristics tend to lower. The coating ratio of the conductive polymer layer is more preferably 10 to 40%.

In the invention, the conductive polymer layer is formed so as to have contact with a portion of the region on the dielectric layer surface by forming the conductive polymer layer like islands on the surface of the dielectric layer. In this case, the manganese dioxide layer is preferably formed so as to cover the conductive polymer layer formed like island and the exposed dielectric layer surface in the surrounding of the conductive polymer layer. Accordingly, in the invention, it is preferable that the conductive polymer layer is formed like islands on the surface of the dielectric layer and the manganese dioxide layer is formed so as to cover the conductive polymer layer and the surface of the dielectric layer. For this reason, the conductive polymer layer is more strongly and firmly stuck to the dielectric layer surface by the manganese dioxide layer and at the same time the effect from the outside such as moisture alteration on the conductive polymer layer can be suppressed to further improve the storage characteristics.

In the invention, the thickness of the manganese dioxide layer is preferably in a range of 10 to 100 nm. If the thickness of the manganese dioxide layer is less than 10 nm, it becomes difficult to obtain the manganese dioxide layer with an uniform thickness and the storage characteristics may be lowered. On the other hand, if the thickness of the manganese dioxide layer exceeds 100 nm, since the conductivity of the manganese dioxide layer is low, ESR may possibly increase. The thickness of the manganese dioxide layer is more preferably in a range of 20 to 70 nm.

In the invention, the anode is formed from a metal or an alloy having valve action. The metal having valve action is not particularly limited if it can be used for solid electrolytic capacitors, and examples thereof include niobium, tantalum, titanium, aluminum, hafnium, zirconium, zinc, tungsten, bismuth, antimony, and the like. Among them, niobium, tantalum, and titanium are preferable since they have high dielectric constant in the form of oxides and their raw materials are made easily available and niobium that, in the form of an oxide, has dielectric constant about 1.5 times as high as that of tantalum is more preferable. As the alloy having valve action, alloys of one or more kinds of metals having valve action such as niobium and tantalum are preferably used. Further, in the case of an alloy of a metal having valve action and a metal having no valve action, the alloy preferably contains 50% by weight or more of the metal having valve action. In the invention, as the metal or the alloy having valve action and forming the anode, niobium or an alloy containing niobium as a main component (that is, containing 50% by weight or more niobium) is particularly preferable.

In the invention, the conductive polymer layer is not particularly limited if it can form an electrolyte layer of solid electrolytic capacitors and examples thereof include polythiophene type polymers such as polyethylenedioxy thiophene and polypyrrole type polymers such as polypyrrole. The conductive polymer layer thereof can be formed by, for example, a chemical polymerization method to form the layer like islands on the dielectric layer.

In the invention, the electrolyte layer consists of, as described above, the conductive polymer layer and the manganese dioxide layer. In the invention, a conductive polymer layer may be formed further on the surface of such an electrolyte layer. Further formation of the conductive polymer layer makes it possible to further reduce ESR. Thus, the conductive polymer layer to be formed further on the electrolyte layer surface is preferably formed by an electrolytic polymerization method in terms of high thin film formation speed.

A production method of the invention is a method for producing the above-mentioned solid electrolytic capacitor of the invention and involves the steps of forming a dielectric layer on the surface of a anode, forming a conductive polymer layer on a portion of the region on the dielectric layer by a chemical polymerization method, and forming a manganese dioxide layer so as to cover the dielectric layer surface where the conductive polymer layer is not formed.

In the production method of the invention, the conductive polymer layer is formed on the dielectric layer surface by a chemical polymerization method to form the conductive polymer layer on a portion of the region on the dielectric layer surface. The chemical polymerization method is a method for forming the conductive polymer layer on the dielectric layer surface and since the thin film formation speed is slow, the conductive polymer layer can be formed like islands on a portion of the region on the dielectric layer surface by adjusting the thin film formation duration.

In the production method of the invention, as described above, after formation of the conductive polymer layer, the manganese dioxide layer is formed and therefore, the manganese dioxide layer can be formed so as to cover at least the dielectric layer surface where the conductive polymer layer is not formed. In general, the manganese dioxide layer is formed in the form of a continuous thin film, so that the manganese dioxide layer can be formed so as to cover the conductive polymer layer and the dielectric layer surface in the surrounding of the conductive polymer layer where the conductive polymer layer is not formed.

In a solid electrolytic capacitor of the invention, similar to the conventional solid electrolytic capacitors, a cathode layer is formed on the electrolyte layer. The cathode layer is not particularly limited if it can be used for solid electrolytic capacitor. However, the cathode layer is generally formed by layering a carbon layer and a silver paste layer. The carbon layer can be formed by, for example, applying a carbon paste and thereafter drying the paste and the silver paste layer can be formed by applying a silver paste and drying the paste.

According to the invention, a solid electrolytic capacitor having low ESR and excellent in the storage characteristics can be obtained.

Further, according to the production method of the invention, a solid electrolytic capacitor having low ESR and excellent in the storage characteristics can be produced efficiently.

DETAILED DESCRIPTION OF THE PREFERRED EMBODIMENTS

Hereinafter, the invention will be described practically along with embodiments and examples, however, the invention should not be limited these embodiments and examples.

Figure 1:
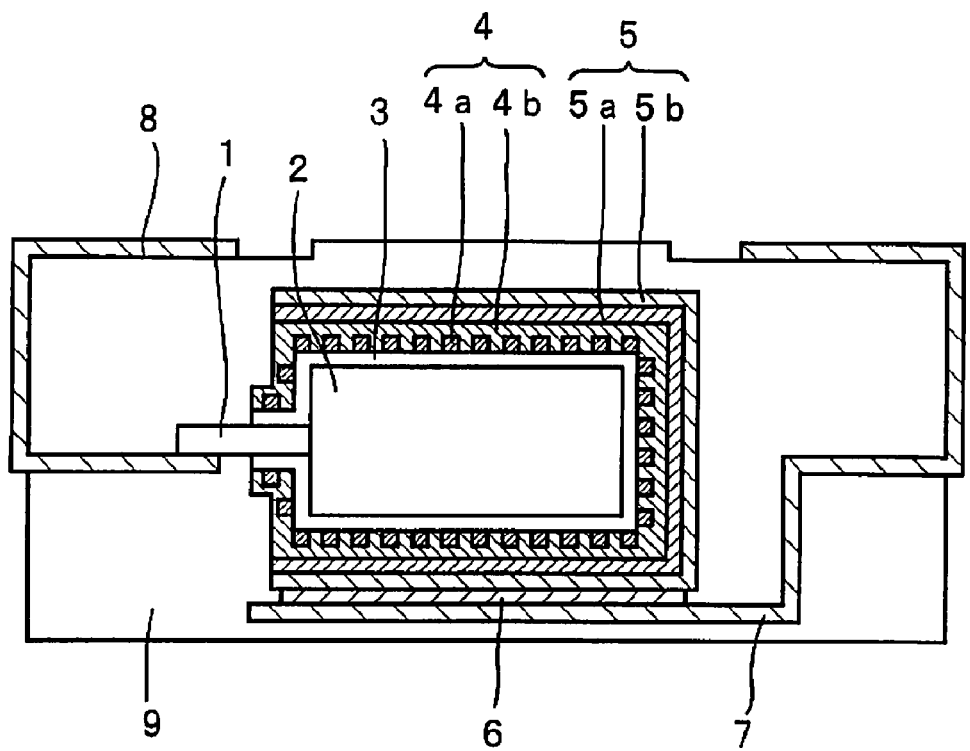
FIG. 1 is a schematic cross-sectional view showing a solid electrolytic capacitor of one embodiment of the invention.

FIG. 1 is a cross-sectional view schematically showing a solid electrolytic capacitor of one embodiment of the invention. As shown in FIG. 1, a powder of niobium, which is a metal having valve action, is sintered and molded to form a porous anode 2. In the anode 2, metal leads 1 made of niobium are embedded.

A dielectric layer 3 is formed on the surface of the anode 2. Since the anode 2 is porous, the dielectric layer 3 is formed on the porous surface of the inside of the anode 2. The dielectric layer 3 is formed generally by anodization. The dielectric layer 3 is a layer containing niobium oxide as a main component.

A conductive polymer layer 4a is formed on a portion of the region on the surface of the dielectric layer 3 so as to have contact with the dielectric layer 3. The conductive polymer layer 4a is formed, for example, from polyethylenedioxy thiophene.

A manganese dioxide layer 4b is formed so as to cover the surfaces of the conductive polymer layer 4a and the dielectric layer 3. An electrolyte layer 4 consists of the conductive polymer layer 4a and the manganese dioxide layer 4b.

A carbon layer 5a is formed on the manganese dioxide layer 4b and a silver paste layer 5b is formed on the carbon layer 5a. A cathode layer 5 includes the carbon layer 5a and the silver paste layer 5b. A cathode terminal 7 is connected on the cathode layer 5 with a conductive adhesive layer 6 interposed therebetween.

An anode terminal 8 is connected with a metal lead wire 1. A mold outer resin 9 is formed so as to lead the end parts of the anode terminal 8 and the cathode terminal 7 outside.

Figure 2:
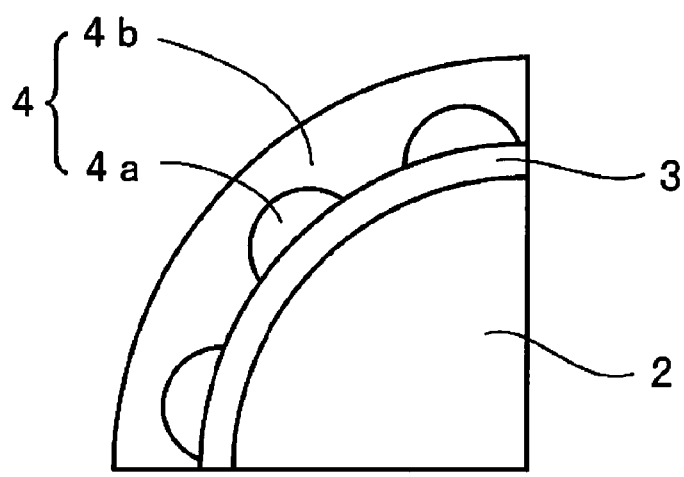
FIG. 2 is a schematic cross-sectional view showing a dielectric layer and an electrolyte layer in the porous inside of an anode.

The anode 2 is, as described above, porous and the dielectric layer 3 and the electrolyte layer 4 formed on the surface of the anode 2 are formed on the porous surface of the inside of the anode 2. FIG. 2 is a magnified cross-sectional view for illustrating the above-mentioned state. The anode 2 is a porous body obtained by sintering a powder and the dielectric layer 3 is formed on the surface and the conductive polymer layer 4a is formed like islands on the dielectric layer 3. Further, the manganese dioxide layer 4a is formed so as to cover the island-like conductive polymer layer 4a and the dielectric layer 3. Accordingly, the dielectric layer 3 and the electrolyte layer 4 on the surface of the anode 2 are, as shown in FIG. 1, not only formed on the outside of the anode 2 but also the surface of the porous parts in the inside of the anode 2. The carbon layer 5a and the silver paste layer 5b are formed by applying pastes and do not penetrate the inside of the porous body and the layers are thus formed on the outside surface of the porous body.

In the above-mentioned embodiment, the conductive polymer layer 4a is formed so as to have contact with a portion of the region on the surface of the dielectric layer 3 and the manganese dioxide layer 4b is formed so as to have contact with the other portion of the region on the surface of the dielectric layer 3. Since the electrolyte layer 4 consists of the conductive polymer layer 4a with high conductivity and the manganese dioxide layer 4b excellent in the adhesiveness to the dielectric layer, formation of the electrolyte layer 4 makes it possible to reduce ESR and improve the storage characteristics.

EXAMPLES

Solid electrolytic capacitors shown in FIG. 1 and FIG. 2 were produced in the following manner.

Example 1

Step 1: A powder of niobium metal with an average particle diameter of 2 μm was sintered to form an anode 2 made of a porous sintered body in which a metal lead wire 1 of niobium is embedded. The anode 2 was anodized at a constant voltage of 10 V for 10 hours in an aqueous 0.5 wt. % phosphoric acid solution kept at 60° C. to form a dielectric layer 3 containing mainly niobium oxide on the surface of the anode 2.

Step 2: A capacitor element in which the dielectric layer 3 was formed was immersed in an aqueous oxidizing agent solution containing 20 wt. % of ferric p-toluenesulfonate for 5 minutes to react with vapor of ethylenedioxy thiophene monomer for 10 minutes and thereafter, heat treatment was carried out at 130° C. for 20 minutes to form a conductive polymer layer 4a of polyethylenedioxy thiophene like islands on the surface of the dielectric layer 3. Next, the anode 2 in which the conductive polymer layer 4a was formed is immersed in an aqueous 30 wt. % manganese nitrate solution for 5 minutes to impregnate the inside of the anode 2 with the aqueous manganese nitrate solution. Thereafter, heat treatment was carried out 170° C. for 10 minutes to form a manganese dioxide layer 4b. The immersion in the aqueous manganese nitrate solution and the heat treatment were repeated three times to form the manganese dioxide layer 4b with a sufficient thickness.

In the above-mentioned manner, after the conductive polymer layer 4a like islands is formed on the dielectric layer 3 by the chemical polymerization method, the manganese dioxide layer 4b was formed so as to cover the conductive polymer layer 4a to form an electrolyte layer 4 consisting of the conductive polymer layer 4a and the manganese dioxide layer 4b.

Step 3: A paste containing graphite is applied to the surface of the anode 2 in which the electrolyte layer 4 is formed to form a carbon layer 5a. Next, a silver paste was applied thereto and dried to form a silver paste layer 5b. A conductive adhesive layer 6 was formed on the silver paste layer 5b and a cathode terminal 8 was connected via a conductive adhesive layer 6. Further, after the cathode terminal 8 was connected with the metal lead wire 1 by resistance welding, transfer molding was carried out using an epoxy resin under molding conditions: a temperature of 160° C., a pressure of 150 kg/cm² for a duration of 90 seconds and thereafter heat treatment was carried out at 150° C. for 4 hours to cure the outer resin and form a mold outer resin 9.

In the above-mentioned manner, the solid electrolytic capacitor of Example 1 was produced.

Example 2

In this Example, a solid electrolytic capacitor was produced in the same manner as in Example 1, except that the conductive polymer layer 4a was formed using polypyrrole.

Practically, after the dielectric layer 3 was formed in the step 1 of Example 1, it was immersed in an aqueous oxidizing solution containing 20 wt. % of ferric p-toluenesulfonate for 5 minutes to react with vapor of pyrrole monomer for 10 minutes to form a conductive polymer layer 4a of polypyrrole like islands on the surface of the dielectric layer 3. Besides that, the solid electrolytic capacitor was produced in the same manner as in Example 1.

Comparative Example 1

A solid electrolytic capacitor of Comparative Example 1 was produced in the same manner as in Example 1, except that only the manganese dioxide layer 4b was formed on the surface of the dielectric layer 3 but no conductive polymer layer 4a containing polyethylenedioxy thiophene was formed in the step 2 of Example 1.

Comparative Example 2

A solid electrolytic capacitor of Comparative Example 2 was produced in the same manner as in Example 1, except that no manganese dioxide layer 4b was formed on the surface of the conductive polymer layer 4a in the step 2 of Example 1.

Measurement of Coating Ratio of Conductive Polymer Layer

The ratio (coating ratio of the conductive polymer layer) of the surface area of the region in which the conductive polymer layer and the dielectric layer surface were brought into contact to the entire surface area of the dielectric layer surface was measured as follows.

In the step 1 of Example 1, after the dielectric layer was formed on the anode surface, a capacitor element was produced without forming the electrolyte layer, the carbon layer and the silver paste layer. The static capacity of the obtained capacitor element is expressed by C1.

Further, in the step 2 of respective Examples and Comparative Examples, after the conductive polymer layer was formed, no manganese dioxide layer was formed and the carbon paste and the silver paste were applied to the surface of the dielectric layer to form the carbon layer and the silver paste layer and thus produce a capacitor element. The static capacity of the obtained capacitor element is expressed by C2. From the static capacities C1 and C2 measured in the above-mentioned manner, the coating ratio of the conductive polymer layer was calculated as follows.

Coating ratio of the conductive polymer layer (%)= (C2/C1)×100.

Figure 3:
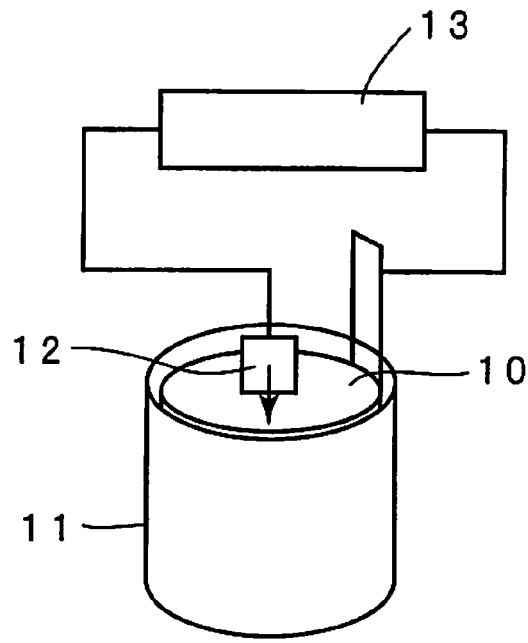
FIG. 3 is a perspective view for illustrating the measurement method of the coating ratio of the conductive polymer layer on the dielectric layer surface.

The static capacity of each capacitor element was measured, as shown in FIG. 3, by using an activated carbon electrode 10 as a counter electrode and immersing each capacitor element 12 in a cell 11 containing an aqueous 30 wt. % sulfuric acid solution as an electrolytic solution and carrying out measurement of the static capacity at a frequency of 120 Hz by LCR meter 13.

Measurement of Thickness of Manganese Dioxide Layer

The thickness of the manganese dioxide layer of each solid electrolytic capacitor of respective Examples and Comparative Examples was measured as follows.

With respect to the anode, dielectric layer, and electrolyte layer of each solid electrolytic capacitor, while sputtering in the depth direction was carried out using an x-ray photoelectron spectroscopic (XPS) apparatus, the concentration distribution of niobium and manganese was measured. The sputtering time until the degree of the composition of niobium and manganese was reversed was measured and based on the sputter rate (10 nm/minute) of silicon oxide used as a standard, the thickness of the manganese dioxide layer was calculated.

Figure 4:
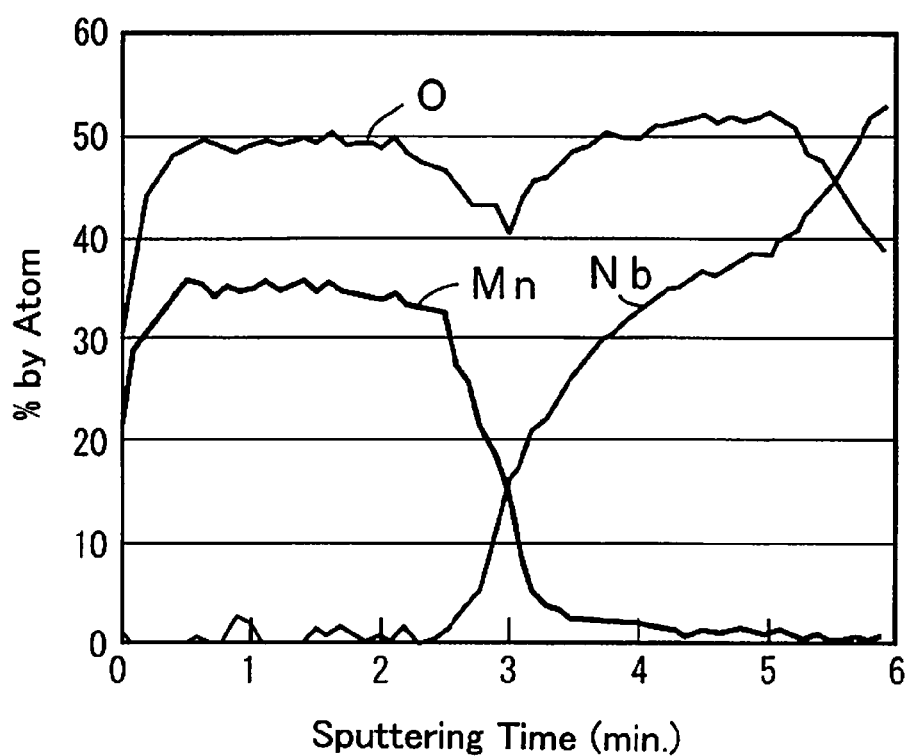
FIG. 4 is a drawing showing the concentration distribution of Mn and Nb in the dielectric layer and the electrolyte layer on the anode surface.

FIG. 4 is a drawing showing an XPS profile. As shown in FIG. 4, herein, the concentrations of manganese (Mn) and niobium (Nb) were reversed at a time of three-minute sputtering. Accordingly, the sputtering time at the moment the composition degrees of niobium and manganese were reversed was determined to be 3 minutes and based on the sputter rate (10 nm/minute) of silicon oxide, the thickness of manganese oxide was determined to be 30 nm.

Measurement of ESR

With respect to solid electrolytic capacitors of respective Examples and Comparative Examples, ESR at a frequency of 100 kHz was measured by an LCR meter.

Measurement of Storage Characteristics

With respect to solid electrolytic capacitors of respective Examples and Comparative Examples, the capacitors were stored at 105° C. for 500 hours. The static capacity C3 before storage and the static capacity C4 after storage were measured at 120 Hz frequency using LCR meter and the capacity retention ratio (%) in the storage characteristics was calculated as follows.

Capacity retention ratio in the storage characteristics (%)=($C4/C3$)×100.

Table 1 shows the measurement results of ESR and storage characteristics of respective solid electrolytic capacitors of Examples 1 and 2 and Comparative Examples 1 and 2. The values of ESR and capacity retention ratio in the storage characteristics are standardized values by setting the values of Example 1 to be 100.

As being made clear from the results shown in Table 1, in Examples 1 and 2 having the electrolyte layer consisting of the conductive polymer layer and manganese dioxide layer according to the invention, ESR became low and the capacity retention ratio in storage characteristics was high.

In Comparative Example 1, since the electrolyte layer consisted of only the manganese dioxide layer, although the capacity retention ratio in storage characteristics was high and well, ESR was increased.

Further, in Comparative Example 2, since the electrolyte layer consisted of only the conductive polymer layer, although ESR was good, the capacity retention ratio in storage characteristics was lowered.

Examples 3 to 9

Herein, the relations of the coating ratio of the conductive polymer layer with ESR and storage characteristics were investigated.

Solid electrolytic capacitors of Examples 3 to 9 were produced in the same manner as in Example 1, except that immersion in an oxidizer containing 20 wt. % of ferric p-toluenesulfonate was carried out and reaction time (polymerization duration) with vapor of ethylenedioxy thiophene pyrrole monomer was changed to be 1 minute, 2 minutes, 5 minutes,

TABLE 1

|  | Polymerization Time for Conductive Polymer Layer (min.) | Coating Ratio of Conductive Polymer Layer (%) | Thickness of Manganese Dioxide Layer (nm) | ESR | Capacity Retention Ratio in Storage Characteristics |
|---|---|---|---|---|---|
| Ex. 1 | 10 | 20 | 30 | 100 | 100 |
| Ex. 2 | 10 | 40 | 30 | 125 | 90 |
| Comp. Ex. 1 | none | — | 30 | 1015 | 105 |
| Comp. Ex. 2 | 10 | 20 | none | 95 | 30 |

10 minutes, 15 minutes, 40 minutes, 90 minutes, and 120 minutes in the step 2 in Example 1.

As be described above, ESR and the capacity retention ratio in storage characteristics were measured. The measurement results are shown in Table 2.

TABLE 2

|  | Polymerization Time for Conductive Polymer Layer (min.) | Coating Ratio of Conductive Polymer Layer (%) | Thickness of Manganese Dioxide Layer (nm) | ESR | Capacity Retention Ratio in Storage Characteristics |
|---|---|---|---|---|---|
| Ex. 3 | 1 | 2 | 30 | 200 | 105 |
| Ex. 4 | 2 | 3 | 30 | 125 | 100 |
| Ex. 5 | 5 | 10 | 30 | 110 | 105 |
| Ex. 1 | 10 | 20 | 30 | 100 | 100 |
| Ex. 6 | 15 | 30 | 30 | 95 | 100 |
| Ex. 7 | 40 | 40 | 30 | 100 | 95 |
| Ex. 8 | 90 | 70 | 30 | 100 | 75 |
| Ex. 9 | 120 | 80 | 30 | 100 | 45 |

As being made clear from the results shown in Table 2, good results were obtained in the case the coating ratio of the conductive polymer layer was in a range of 3 to 70%.

Examples 10 to 14

Herein, the relations of the thickness of the manganese dioxide layer with ESR and storage characteristics were investigated.

Solid electrolytic capacitors of Examples 10 to 14 were produced in the same manner as in Example 1, except that the number of the steps of forming the manganese dioxide layer was changed to be 1 time, 2 times, 5 times, 10 times, and 15 times. The measurement results are shown in Table 3. Table 3 shows the results of Example 1 as well.

TABLE 3

|  | Polymerization Time for Conductive Polymer Layer (min.) | Coating Ratio of Conductive Polymer Layer (%) | Number of Coating Times of Manganese Dioxide | Thickness of Manganese Dioxide Layer (nm) | ESR | Capacity Retention Ratio in Storage Characteristics |
|---|---|---|---|---|---|---|
| Ex. 10 | 10 | 20 | 1 | 7 | 95 | 55 |
| Ex. 11 | 10 | 20 | 2 | 10 | 100 | 90 |
| Ex. 1 | 10 | 20 | 3 | 30 | 100 | 100 |
| Ex. 12 | 10 | 20 | 5 | 50 | 110 | 100 |
| Ex. 13 | 10 | 20 | 10 | 100 | 125 | 110 |
| Ex. 14 | 10 | 20 | 15 | 150 | 395 | 105 |

As being made clear from the results shown in Table 3, it can be understood the thickness of the manganese dioxide layer is preferably in a range of 10 to 100 nm.

Example 15

In this Example, an electrolyte film of pyrrole was further formed on the manganese dioxide layer and ESR and the storage characteristics were measured.

A solid electrolytic capacitor was produced in the same manner as in Example 1, except that the polypyrrole layer in a thickness of 100 nm was formed on the manganese dioxide layer by an electrolytic polymerization method and ESR and the storage characteristics were measured. The measurement results are shown in Table 4.

TABLE 4

|  | Polymerization Time for Conductive Polymer Layer (min.) | Coating Ratio of Conductive Polymer Layer (%) | Thickness of Manganese Dioxide Layer (nm) | PPy Electrolytic Polymerization Film | ESR | Capacity Retention Ratio in Storage Characteristics |
|---|---|---|---|---|---|---|
| Ex. 15 | 10 | 20 | 30 | formed | 75 | 95 |
| Ex. 1 | 10 | 20 | 30 | none | 100 | 100 |

As shown in Table 4, formation of an electrolytic polymerization film of pyrrole (PPy electrolytic polymerization film) on the manganese dioxide layer can further reduce ESR.

Observation by Transmission Electron Microscope

A cross-section of the sample of Example 7 was observed by a transmission electron microscope (TEM), and the length A of the sintered particle surface in the anode and the length B of the portion coated with the conductive polymer layer within the observed range were measured and when the ratio of A to B was calculated, it was about 40%. Accordingly, the observation results by the transmission electron microscope were found to be approximately same as the covering ratio of the conductive polymer layer calculated as described from static capacities.

In the above-mentioned Examples, niobium was employed as the metal having valve action for forming the anode and in the case tantalum was used as the metal for valve action, ESR was reduced and the storage characteristics was improved similarly.

What is claimed is:

1. A solid electrolytic capacitor comprising:
   an anode made of a metal or an alloy having valve action;
   a dielectric layer formed on said anode; and
   an electrolyte layer composed of a conductive polymer layer formed so as to have contact with a portion of the region on the surface of said dielectric layer, and a manganese dioxide layer formed so as to have contact with the other portion of the region on the dielectric layer surface
   wherein said conductive polymer layer is formed like islands on the surface of said dielectric layer and said manganese dioxide layer is formed so as to cover said conductive polymer layer and the surface of said dielectric layer, and
   wherein the covering ratio of said conductive polymer layer, which is the ratio of the surface area where said conductive polymer layer is brought into contact with said dielectric layer, relative to the entire surface area of said dielectric layer, is in the range of 3 to 70%.

2. The solid electrolytic capacitor according to claim 1, wherein the thickness of said manganese dioxide layer is in the rage of 10 to 100 nm.

3. The solid electrolytic capacitor according to claim 1, wherein said metal or alloy having valve action is niobium or an alloy containing niobium as a main component.

4. The solid electrolytic capacitor according to claim 1, wherein said conductive polymer layer is made of polyethylenedioxy thiophene or polypyrrole.

5. The solid electrolytic capacitor according to claim 1, wherein a conductive polymer layer is further formed on the surface of said electrolyte layer.

6. A method for producing the solid electrolytic capacitor according to claim 1 comprising the steps of:

forming said dielectric layer on the surface of said anode;

forming said conductive polymer layer on a portion of the region on said dielectric layer surface by a chemical polymerization method; and forming said manganese dioxide layer so as to cover at least said dielectric layer surface where said conductive polymer layer is not formed.

7. The solid electrolytic capacitor according to claim 2, wherein said metal or alloy having valve action is niobium or an alloy containing niobium as a main component.

8. The solid electrolytic capacitor according to claim 2, wherein said conductive polymer layer is made of polyethylenedioxy thiophene or polypyrrole.

9. The solid electrolytic capacitor according to claim 3, wherein said conductive polymer layer is made of polyethylenedioxy thiophene or polypyrrole.

* * * * *